United States Patent [19]

Wurst et al.

[11] Patent Number: 4,925,133
[45] Date of Patent: May 15, 1990

[54] HYDRAULIC BUOYANCY FORCE SUIT

[75] Inventors: Stephen G. Wurst, Orange; William J. Adams, Torrance; Kenton M. Munson, Monrovia, all of Calif.

[73] Assignee: Rockwell International Corporation, El Segundo, Calif.

[21] Appl. No.: 289,846

[22] Filed: Dec. 27, 1988

[51] Int. Cl.⁵ .................. B64D 10/00; B64D 25/02
[52] U.S. Cl. .................. 244/118.5; 244/121; 244/122 AG; 600/20; 2/2.1 A
[58] Field of Search ............ 244/122 R, 121, 122 AG, 244/122 B, 118 S; 600/19, 20; 2/2.1 A

[56] References Cited

U.S. PATENT DOCUMENTS

| | | | |
|---|---|---|---|
| 2,228,115 | 1/1941 | Holste | 128/1 |
| 2,335,474 | 11/1943 | Beall | 128/1 |
| 3,089,482 | 5/1963 | Gray | 244/118.6 |
| 3,099,261 | 7/1963 | Doss et al. | 244/122 B |
| 3,137,290 | 6/1964 | Gongwer | 600/19 |
| 3,278,230 | 10/1966 | Boyce et al. | 600/20 |
| 3,302,633 | 2/1967 | Vykukal | 600/20 |
| 3,528,414 | 9/1970 | Schvella | 2/2.1 A |
| 3,536,576 | 10/1970 | Schwartz | 2/2.1 A |
| 4,446,491 | 10/1985 | Beaussant | 2/2.1 A |

OTHER PUBLICATIONS

Gray, R. F. and Lt. Cdr. M. G. Webb, "High G Protection", Aerospace Medicine, May 1961.
Lambert, E. H., Wood, E. H., Baldes, E. J. and Code, C. G., Report No. 248, Office of Scientific Research Development, Jan. 19, 1944.
Office of Scientific Research and Development, May 27, 1944.
Gillies, J. A., *A Textbook of Aviation Physiology*, 1965, p. 669.
Lambert, E. H., and Wood, E. H., "The Problem of Blackout and Unconsciousness in Aviators," as reported by Gauer and Zuidena, Gravitational Stress in Aerospace Medicine, 1961, p. 75.
Hrebien, L., "Current and Emerging Technology in G-LOC Detection: Pulse Wave Delay for $+G_z$ Tolerance Assessment", Aviation Space and Environmental Medicine, Jan. 1988.

*Primary Examiner*—Galen Barefoot
*Attorney, Agent, or Firm*—Charles T. Silberberg; Lawrence N. Ginsberg

[57] ABSTRACT

A method and apparatus for maintaining useful conciousness and reducing the risk of injury for a subject exposed to high levels of acceleration while in a vehicle. A buoyancy force suit is provided for supporting the subject with a buoyancy force. The buoyancy force suit includes at least two layers of flexible material, each layer being relatively impermeable to a substantially incompressible fluid locatable in a space between the layers. The suit fits over substantially the entire subject, including the subject's neck. A fluid reservoir is provided for maintaining a constant fluid level within the buoyancy force suit during acceleration. The fluid reservoir is supported at substantially the subject's eye level for maintaining an optimal fluid pressure gradient for ensuring an efficient blood supply to the subject's brain. Means are provided for securely suspending the buoyancy suit within the vehicle. A regulator is also provided for compensating for any increased pressure exerted on the subject's rib cage as a result of the force suit. The force suit provides a balance counterpressure to the force of acceleration thereby reducing distension in the subject's blood vessels and the pooling of blood.

15 Claims, 6 Drawing Sheets

HYDRAULIC BUOYANCY FORCE SUIT

BACKGROUND OF THE INVENTION

1. Field of the Invention

This invention relates to protecting human subjects exposed to high levels of acceleration. More particularly, it relates to applying buoyancy induced forces to the human body to expand the limits of useful consciousness, and reduce the risk of injury.

2. Description of the Related Art

Modern high performance fighter aircraft are capable of flight maneuvers which subject the crew members to very high forces of acceleration. Severe stresses are placed on the crew members by such aircraft maneuvers. Indeed, many modern aircraft are capable of aerial maneuvers which are beyond the tolerance of the human crew members. Consequently, fighter aircraft and their crew members are occasionally lost as a result of pilot blackout.

Aircraft equipment malfunction or adverse environmental conditions may occasionally make proper control of the aircraft so difficult as to render it improbable that the aircraft can be safely landed. Enemy fire in combat situations may seriously disable an aircraft or crew member making it also improbable that the aircraft can be brought to a safe landing. In such situations, ejection of the crew members from the aircraft may be desirable. However, in some such situations, the high forces of acceleration generated by catapult ejection systems may be added to the forces generated by the motion of the aircraft and the total forces may thus exceed the tolerance of the crew members. Consequently, pilots and their crew members are occasionally killed or severely disabled as a result of ejection from an aircraft.

Several approaches have been proposed for solving the problem of High "G" Forces. For example, co-applicant S. G. Wurst is the applicant of a copending patent application Ser. No. 175,660 entitled, "High 'G' Protection System" now U.S. Pat. No. 4,834,322, issued May 30, 1989. That patent application (assigned to the present assignee, Rockwell International Corporation) discloses a seat restraint system for supporting the occupant in a leaned forward or crouched position. This results in a reduced hydrostatic column between the aorta and retina of the eye and thus the acceleration to which the occupant is exposed can be raised. Although such a restraint system results in enhanced vehicle occupant capability in the face of high acceleration forces, the occupant is still subjected to physical strain. The strain results from the skeleton having to support the acceleration induced increase in weight of the body masses.

Co-applicant W. J. Adams is a co-applicant of a co-pending patent application, Ser. No. 249,794, entitled "Head Support/Spine Offloading Ejection Seat Insert" (also assigned to the present assignee). That patent application discloses a device insertable within the existing seat of a vehicle for maintaining a crew member of the vehicle in a forward posture during high g acceleration. The seat insert reduces the risk of spinal injury by offloading the crew member's spine and supporting the spine in its natural curvature, thereby preventing harmful bending of the spine and non-uniform load distribution across individual vertebrae interfaces.

Beginning in the 1940's, numerous studies were conducted at various centrifuges to determine the effect of water immersion on human g tolerance. The most notable of these efforts was conducted in 1958 at the Naval Air Development Center Centrifuge, in Johnsville, Pa. As reported by R. F. Gray and Lt. Cdr. M. G. Webb in "High G Protection", Aerospace Medicine, May 1961, subjects tolerated $+16$ $g_z$ and $+31$ $g_x$ when submersed in a water-filled capsule. The effect of submersion in a water capsule has also been studied at the Mayo Clinic, including tests conducted as early as 1943 by E. H. Wood.

The first practical water-filled g suit was developed during World War II. The suit, which resembled a pair of hip waders, was found to increase g tolerance by $1\frac{1}{2}$ g's. It was also found that inflating the suit with air, which was lighter and less cumbersome, also provided a 2.2 g increase in g tolerance (Lambert, E. H., Wood, E. H., Baldes, E. J., and Code, C. F., Report Number 248, Office of Scientific Research and Development, 19 Jan. 1944. Lambert, E. H., Wood, E. H., Baldes, E. J., and Code, E. F., Report Number 308, Office of Scientific Research and Development, 27 May 1944.). After many more modifications, the standard pneumatic g suit eventually evolved from these studies. The standard g suit provides a 2 to 2.5 g improvement in g tolerance.

U.S. Pat. No. 2,228,115, issued to M. R. Holste, discloses a water-filled suit which covers the entire body including the feet and hands from the base of the neck down to the bottom of the feet. The garment is formed of flexible inner and outer walls to form attenuated or thin chambers that contain water that is free to circulate therein. The inner shell is collapsable and may be of elastic material. The outer shell should be quite inelastic, although very flexible. The suit is supported by a frame which contains a metal yoke around the neck to which the suit is attached.

The Holste device is deficient in that during its use there would be distension of the carotid artery due to the heartbeat pulse triggering the stretch receptors to reduce heart output pressure. Furthermore, no means are provided to assure that the hydrostatic pressure column within the suit is kept at an appropriate level during use so as to prevent the application of too much pressure or too little pressure to the wearer's body. Furthermore, during use, the excessive pressure exerted on the chest by the suit will hinder pilot breathing. No means are provided to assist pilot breathing.

U.S. Pat. No. 2,335,474, issued to H. W. Beall, discloses a suit consisting of a snuggly fitting inner body garment portion and a spaced outer garment portion. The spaced outer portion forms a sack of fluid-tight compartments in the form of long, narrow sack members in free communication with each other. The suit contains a neck band which is pressurized with air when required for crew protection. This suit design is deficient in that the fluid-tight compartments or tubes become circular when exposed to acceleration, reducing the surface area in contact with the wearer. As a result, longitudinal areas are formed, running the length of the wearer's body, which are not covered by the tubes. These areas provide paths for blood to flow directly down to the feet, an undesirable result. A reservoir is provided for filling and draining the suit. In operation water is pumped from the reservoir into the suit before g onset and then the suit is drained after the g episode. Such a draining and filling concept could not be made to operate fast enough for use with today's highly manueverable aircraft.

U.S. Pat. No. 4,546,491, issued to R. B. Beaussant, discloses a garment having pockets and a regulator for controlling the air pressure within the pockets. The device includes a regulator which control air pressurization of the garment. The trouser pockets are partially filled with water. Utilizing pockets with upper compartments for pressurized air and lower compartments for water is potentially injurious inasmuch as too much pressure is exerted o the portion of the legs covered with water. (The pressure exerted is the sum of the air pressure and water pressure.) Furthermore, the Beaussant device, like the Holste and Beall devices is deficient with respect to its ability to provide a desired counter-pressure to the neck.

OBJECTS OF THE INVENTION

A principle object of the present invention therefore is to maintain the useful consciousness and reduce the risk of injury for a subject exposed to high levels of acceleration while in a vehicle.

Another object is to restrain and support the crew member of a aircraft throughout a wide range of accelerations which commonly occur during aerial maneuvering, while simultaneously providing the crew member the mobility to swivel his body around, as required, to view the external situation.

Another object is to expand the available safe escape envelope for the crew member of a aircraft.

Another object is to provide protection from high altitude exposure.

Yet another object is to provide protection from the temperature extremes encountered during high altitude, high speed escape from the aircraft.

Still another object is to provide a buoyancy force suit which can be utilized in an aircraft in which the crew members utilize the forward leaning posture to reduce the eye-to-heart vertical distance to gain added g-tolerance.

Still another object is to provide a buoyancy suit system which is compatible with an ejection seat.

Yet another object is to allow higher levels and longer duration accelerations for astronauts during ascent, reentry, and protection from low atmospheric pressure during intervehicular transfers in space.

Yet another object is to allow manned operations in intense extraterrestrial acceleration fields.

Other objects, advantages and novel features of the present inventions will become apparent from the following detail description of the invention when considered in conjunction with the accompanying drawings.

SUMMARY OF THE INVENTION

The present invention is a method and apparatus for maintaining useful consciousness and reducing the risk of injury for a subject exposed to high levels of acceleration while in a vehicle. In its broadest aspects, the invention comprises a buoyancy force suit, a fluid reservoir, breathing assist means, and means for supporting these components to the vehicle. The buoyancy force suit supports the subject with a buoyancy force, within the vehicle. It includes at least two layers of fabric, each layer being impermeable to a substantially incompressible fluid. The suit fits substantially over the entire subject, including the subject's neck. The fluid reservoir is in fluid communication with the buoyancy force suit and provides make-up fluid to the suit in the event of its expansion during acceleration.

The fluid reservoir is supported at substantially the subject's head level, to maintain the reservoir fluid level at approximately eye level. This maintains an optimal fluid pressure gradient on the wearer's body for assuring efficient blood supply to the subject's brain. The force suit provides a balanced counterpressure to the force of acceleration, thereby reducing the expansion of the subject's blood vessels and thus pooling of blood. The suit of the present invention differs from previous g tolerance suits in that the pressure applied to the person wearing the suit is very closely matched to the hydrostatic pressures within the blood vessels throughout the body, including the neck. This is achieved through the use of the reservoir which is in fluid communication with the suit. The surface of the fluid within the reservoir is kept at eye level. This allows the correct pressure to be applied to both the body and the neck. The suit uses a hydraulic medium to achieve proper distribution and magnitude of the acceleration forces.

The buoyancy forces provided by the suit support the wearer's muscle masses, viscera, etc., thereby removing their weight from the skeleton and thus minimizing injury risk to the skeleton during intense short term accelerations such as those experienced with air vehicle escape systems.

BRIEF DESCRIPTION OF THE DRAWINGS

FIG. 1a illustrates a part of FIG. 1 showing a portion of the buoyancy suit cut away and opened up to expose the different layers of the suit.

FIG. 7b shows a back view of the suit support assembly of FIG. 7a.

FIG. 8b shows a back view of the suit support assembly of FIG. 8a.

Figure 8A:
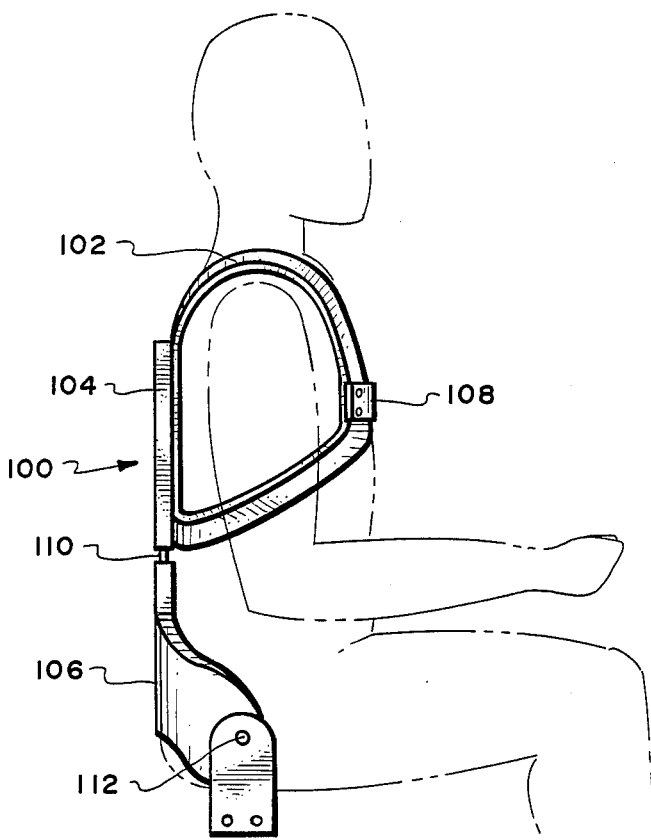
FIG. 8a illustrates a side view of an alternate suit support assembly.

8c illustrates a front view of the suit support assembly of FIG. 8a.

The same elements or parts throughout the figures are designated by the same reference characters.

DETAILED DESCRIPTION OF THE INVENTION

THEORETICAL CONSIDERATIONS

When a force field, such as gravity, is applied so that the particular force upon each particular unit of mass throughout the body is proportional to the mass of that unit, acceleration of a body can be achieved without distortion of the body. (Body distortion as a result of blood pooling or differential motion between body masses is the primary cause of acceleration induced blackout and/or injury.) There is no body distortion because the orientation and the magnitude of the acceleration is a constant throughout the body. Take, for instant, a person, "dropped" in space over the earth. The person, would sense "freefall", that is, no distortion of the body due to surface or contact force, even though the person were accelerating at 1 "g" or 32 ft/sec$_2$. The same person, "dropped" in space over planet Uranius (15 times the mass of the earth) would also sense free fall even though the person would be accelerating at 15 g's or 480 ft/sec$^2$. Because the forces are properly applied, the person does not even sense the forces. However, if the force was applied to a particular point on the body (e.g. the feet), it would create debilitating effects. Thus, the method of applying acceleration forces, and not just the magnitude of those forces, is critical.

Buoyancy forces act much like aerodynamic lift forces, that is, it is the difference in pressure between the upper and lower surfaces that contribute to a net force. For hydraulic mediums, this force is proportional to the depth of the water. Each infinitesimal small unit of volume throughout a submerged body feels less pressure force on the side facing the direction of the acceleration. The resulting net pressure differentials tend to buoyantly accelerate the body at the same rate as the fluid if the fluid is selected to closely match the density of the body. As a result, very little distortion of the body occurs, and very high acceleration can be tolerated. These locations within the body for which the density is not uniform, most notably the lungs, do become a limiting factor, and will be discussed in more detail below.

Pneumatic pressurization can be used to minimize the pooling of blood but pneumatic pressurization does little to reduce the discomfort and risk of injury which accompanies acceleration forces applied to individuals wearing only pneumatic garments. Since the air within pneumatic garments is considerably less dense then water there is no pressure gradient formed in the direction of acceleration.

Therefore, acceleration forces are transmitted to the body mostly by physical contact of the body with the accelerating structure (e.g. a seat) rather than fluidic pressure forces. In order to illustrate this point, take as an example a water balloon placed in a bucket of water. Regardless of how fast the bucket of water is twirled around, the radially inward acceleration does not distort the balloon. However, if that same balloon is placed in a bucket and the bucket is then capped and pressurized with air, the balloon will flatten out in the bottom of the bucket under even the slightest accelerations. The pneumatic pressurization does not contribute to the transmission of the net accelerative force onto the body. In fact, it actually appears that the pneumatic pressurization opposes the acceleration of the body, and hence the contact forces must be even greater to oppose the greater pneumatic forces.

This adverse affect of pneumatic pressurization can be mitigated if the device used for applying the pressure is divided into segments and each segment is individually pressurized to achieve the gradient. Thus correctly applying the pneumatic pressurization would require complex valving and very accurate sensors. Therefore, suspension within a hydrostatic medium, as proposed by the present applicants, is the most efficient means of simultaneously mininizing both crew member discomfort from distortion and pooling of blood.

Previous air-filled protective garments did not properly balance counterpressure to the pressure within vessels under the garments. Instead, most acted to overpressure the lower extremities and abdomen to force blood to return to the heart. The increased volume of blood available at the heart is sensed by the stretch receptor on the right heart and the heart output is increased accordingly. This results in approximately a 1 g to 1½ g increase in g tolerance. Pneumatic bladders, however, are not a very efficient means of applying counterpressure. In static tests conducted by present co-applicants, Munson and Wurst, it was found the pressure exerted on a person wearing a pneumatic bladder standard Air Force issue g-suit varied from zero to half the pressure within the bladder. (This is because the suit does not contact the skin around the whole circumference of the leg. As the bladder fills with air the edges of the bladder lift away from the body.)

It is very difficult, then, to accurately regulate the amount of pressure applied to the person wearing a pneumatic bladder suit. Moreover, since the pressure varies greatly from place to place, the blood vessels beneath adjust to compensate. That is, the blood vessels are actively regulated by the body so that those not pinched off by external pressure expand dramatically to compensate for those that are collapsed., Unfortunately, these distended vessels can be even more susceptible to further distension due to the increase in local blood pressure during accelerations. This is because the vessels thin out when they distend, and the thinner tissue is more susceptible to further distension. A water-filled suit applies a much more uniform counterpressure, thereby eliminating this problem. Thus, it ensures the maxiumum possible amount of blood is returned to the heart. There is good evidence of this, for it was noted very early in the development of the Franks Flying Suit that the individuals wearing the suit experienced an urgent need to urinate immediately following use of the suit. It was speculated that this was brought about because the water-filled Franks Flying Suit increased the amount of blood returned to the right heart. This distended the stretch receptor located at the right heart. One of the functions of this stress receptor is, to signal the heart to increase output when a "backlog" of blood has accumulated at the right heart.

Simultaneously, when stretched, this receptor signals the body to reduce the overall volume of blood within the body. This is accomplished by increasing the activity of the kidneys, thereby increasing urinary output. So it appears that any suit, if it is working toward maximizing the amount of blood returned to the heart, should produce a diuretic effect. Such an effect has been noted by individuals wearing water-filled suits, but has never been documented for individuals wearing pneumatic bladder suits, even after long exposures to high accelerations (Gillies, J. A., *A Textbook of Aviation Physiology*, 1965, pg. 669.)

This is not to say that a pneumatic suit could not be constructed that would produce the appropriate pressure gradient just as rapidly as a water-filled suit. In some applications, it may be appropriate to substitute pneumatic bladders for a water-filled suit, and such a pneumatic bladder suit should be considered included in this description. Of course, there are several drawbacks to pneumatic bladder suits, each of which should be weighed in any selection process between water-filled suits and pneumatic bladder suits.

First pneumatic bladder suits do not uniformly distribute the body/seat-pan contact forces, and no reduction in discomfort is realized. In addition, it is difficult to precisely match the internal pressure gradient without numerous very fast acting valves and segmented bladder, all of which adds a great deal of complexity. This also lowers reliability, and one should be very careful to maintain high reliability for any acceleration protection system, since the consequences of malfunction can be disastrous.

Second, pneumatic bladder suits cannot apply pressure to the wearer with the speed that a water-filled suit can. It is important that pressure be applied to the body at the same time as the acceleration to prevent blood from being shifted within the body. If blood shifts towards the lower portion of the body before the pneumatic suit applies pressure, the suit will actually function to hinder blood return to the heart rather than promote it. Thus, valves which rapidly pressurize the suit upon sensing g have been developed. However, regardless of how fast the valve pressurizes the suit, it will never be able to achieve a pressurization rate proportional to the acceleration onset rate. This is because air is compressible and thus there is a time period after g onset in which gas compression is taking place within the suit, during which the suit3 s internal pressure lags the valve's output pressure. Approaches to minimizing the pressurization lag have included delivery of high air mass flow rate to the suit immediately upon sensing acceleration. This approach has resulted in more pressure than required and severe discomfort. Another approach which has been considered is pressurizing the pneumatic suit with air prior to the acceleration by use of devices which predict when the acceleration is going to occur. Such a device would need to be capable of predicting how and when the pilot would perform g maneuvers. The uncertainties associated with combat flight makes such a device difficult if not impossible to develop.

The buoyancy suit of the present invention obviates the need for fast acting valves, and g anticipating mechanisms. The buoyancy suit always contains an incompressible fluid (i.e., it is not filled prior to acceleration and then drained after) and therefore there is no time lag in pressure application to the wearer. Also, since water is approximately the same density as blood, the pressure applied to the body is correct. Thus, the problems associated with pneumatic suits, including the pressure application lag time, application of too much or little pressure, and the design complexity associated with fast-acting g valves and anticipatory mechanisms, are eliminated.

Suspension within a hydrostatic medium combined with an increase in intrapulmonary pressure achieved by delivering air under pressure to the mouth and nose, increases g tolerance.

During high levels of acceleration the blood pressure at head level becomes insufficient to support oxygen transport to the eye and brain. This can typically result in tunnel vision, greyout, and loss of consciousness. In order to understand how increased intrapulmonary pressure increases head level blood pressure and thus g tolerance, and how the present invention implements this, a discussion of the cardiovascular system is in order.

The blood pressure within each vessel varies dramatically along the direction of the resultant acceleration. For headward ( + $g_z$) accelerations, this results in a considerable drop in pressure within the blood as it ascends into the head. Since the eye is approximately 340 mm above the aortic valve, this equates to a 25 mm $H_g$ drop in pressure at 1 g (340 mm $H_2O$ ×1 mm $H_g$/13.6 mm $H_2O$ =25 mm $H_g$). At 4 g, that same column of blood is equivalent to 100 mm $H_g$, and since the heart's pumping pressure is 120 mm $H_g$, the blood pressure at the eye drops to 20 mm $H_g$. Since it takes approximately 20 mm $H_g$ blood pressure to perfuse the eye with blood, any further increase in acceleration results in a loss of vision. The brain requires a lesser perfusion pressure, and typically impairment of mental function will occur just after loss of vision. A person can regulate his intrathoracic pressure from being nearly equivalent to atmospheric pressure to approximately 100 mm $H_g$ above atmospheric pressure (zero to 100 mm $H_g$ gauge). Maintaining a 100 mm $H_g$ intrathoracic pressure requires considerable straining, commonly referred to as an "M-1" maneuver. This maneuver is fatiguing and, therefore, cannot be carried out indefinitely. However during such a maneuver, one can increase his blood pressure at the aorta from 120 to 220 mm $H_g$ above atmospheric.

If the person executes an M-1 maneuver to raise his intrathoracic pressure to 100 mm $H_g$, the blood pressure at the aorta will be 220 mm $H_g$ above atmospheric. Therefore, the straining individual will begin to note loss of vision at 8 g's.

A method called positive pressure breathing (PPB) can be used to increase intrathoracic pressure and thus the heart's pumping pressure, without the fatigue which results from performing the M-1 PPB is implemented by breathing pressurized air thru an oxygen mask and by pressurizing an air-filled garment encircling the rib cage with an equivalent pressure. The chest garment is required to prevent injury from over expansion of the lungs. With the PPB technique, intrathoracic pressure is increased without requiring the physical work associated with performing the M-1. The pressure in the mask and chest counterpressure garment are typically increased in proportion to the g force being experienced by the subject. The buoyancy suit system implements the PPB function. The suit provides the necessary counterpressure and the mask pressure is controlled to be approximately equal to the suit's chest level pressure. The result is an intrathoracic pressure increasing in proportion to g force which does not require physical work by the subject to create.

Moreover it is even more important to note that complete upper body pressurization, including the eyes, is self-defeating. That is because every additional increment of pressure at the eyes will require a similar increase in pressure at the heart, and therefore, adding such complexity does little to improve one's ability to withstand g. Studies have shown that decreasing the pressure felt at the eye through the use of suction cups over the eyes, can delay the effects of greyout (Lambert, E. H., and Wood, E. H., "The Problem of Blackout and Unconsciousness in Aviators," as reported by Gauer and Zuidema, *Gravitational Stress in Aerospace Medicine,* 1961, pg. 75. Any additional pressure at the eye will lower the level of acceleration at which visual symptoms will occur.

Therefore, any device which adds pressure at the chest must be designed so as to not increase pressure at the head. The subject invention meets this requirement.

Water coverage of the neck is important due to the role the carotid artery stretch receptor plays in cardiovascular function. A discussion of this function follows:

Blood returns from throughout the body to the right heart. Stretch receptors at the right heart determine the volume of blood available to be pumped, and typically, send signals to the right heart to pump all of the blood available. This blood goes to the lungs and returns to the left heart.

From there it is pumped to the aorta, where another set of stretch receptors sense and regulate the output pressure of the heart. From there the blood flows throughout the body. The carotid artery carries blood up the neck and to the eyes and brain. Another stretch receptor is located at the base of the jaw on the carotid artery, and it too, senses and regulates heart output.

Each of the receptors, at the right heart, aorta, and carotid artery, senses the distension of the blood vessel. If the blood pressure within the vessel is much higher than the pressure in the body cavity surrounding the vessel, the vessel expands. The receptors sense this "stretching" and send out signals accordingly. Conversely, the receptors can also sense a reduction in the cross-section of the vessels, and then send out signals accordingly. Hence, the receptors sense a "gauge pressure" at these particular locations. This pressure is commonly referred to as the transmural pressure ' the difference between the pressure within the vessel and just outside the vessel. Without external pressure applied to the neck, any increase in the output pressure of the heart will be sensed as a stretching of the carotid artery. The carotid artery stretch receptor would then send a signal to the heart to "throttle back". This signal appears strong enough to override the signals from the other stretch receptors. Therefore, the right amount of counterpressure to the neck will not only prevent the carotid receptor from reducing the heart output, but the counterpressure can be used to increase the heart output.

A centrifuge experiment conducted by co-applicants Munson and Wurst tend to collaborate this hypothesis. Human subjects wore water-filled garments which applied counterpressure from the neck down during centrifuge runs Each of the subjects described a noticeable dimming of vision immediately following the application of the acceleration. Subsequently however, each subject commented that their normal vision was restored, and clear vision was maintained throughout the remainder of the acceleration, even at accelerations well above the level the subjects normally tolerated when not wearing the protective garment. However, when the external pressure was not applied to the neck, the subjects did not exhibit dramatic increases in g tolerance. This indicated that the proper application of counter-pressure to the neck and carotid artery is of utmost importance in achieving significant increase in g tolerance.

The pressure applied to the neck must be very accurately regulated. Both the carotid artery and jugular vein pass through the neck. The jugular vein can, in some instances, operate at a pressure below atmospheric, that is, it helps to siphon the blood out of the head. If too much pressure is applied there is a possibility that the vein may collapse. At the same time, too much pressure on the carotid artery would tend to restrict the flow to the head. Too little pressure, and the carotid artery receptors sense high transmural pressure, and send signals to reduce the heart output. To add to the problem, the counterbalance pressure at the base of the neck should be greater than that at the top of the neck, in order to match the pressure gradient existing within the vessels themselves.

Furthermore, the pressure at each point should be varied according to the level of acceleration, and during fast onsets of acceleration, the applied counterpressure has to vary rapidly. The least complex method of accomplishing this balanced counterpressure is to surround the neck with water.

Wearing the hydraulic buoyancy force suit acts to reduce the distension of arteries within the neck by applying a balanced counter pressure. Without neck counterpressure, the distension of the carotid artery due to the heart beat pressure pulse triggers the stretch receptors to reduce heart output pressure.

The need for very accurate counterpressure application to the neck arteries is further supported by the fact that only small blood pressure changes within them are necessary to cause a change in their diameter and thus activation of the baroreceptors. A description of why the neck artery's diameter is so sensitive to its internal pressure follows.

When the transmural pressure at any particular blood vessel is greater than usual, the vessel stretches until a new equilibrium condition is reached. Thus, the volume of the vessel increases. This is commonly referred to as "compliance." As the heart squeezes blood out of the left chambers and into the aorta, both the pressure and the volume within the aorta increase. This local disturbance travels out from the heart along the arteries at a wave speed that is a function of the compliance of the vessels. Visualize a long water ballown laying on a table. If you tap one end of the balloon, the pressure disturbance travels as a wave down the balloon. This wave speed is considerably slower than the speed a pressure pulse would travel down a rigid walled container filler with the same fluid. If the vessel is distended prior to the addition of the pressure pulse, the pressure pulse will travel slower.

That is because the compliance of a vessel increases as the vessel distends. In other words, if the vessel walls are already stretched out, they are thinner, and will be able to offer less resistance to further stretch. At the same time, once the vessels are stretched there is a larger area exposed to the pressurized fluid within. Therefore, there is a greater net force felt within the vessel wall. (A large diameter pipe must have thicker walls to hold the same amount of pressure as a small diameter pipe.) This greater force results in an even greater stretching of the wall. This effect can be illustrated by inflating a balloon with air. It may be difficult to get the very first breath of air into the balloon, but once that has been accomplished, each succeeding breath becomes easier to accomplish. So then, measuring the time it takes for the pressure pulse associated with heart beat to travel from the aorta to the temple is a good indication of the distension of the vessels in between.

A study has been conducted which showed that there is indeed a substantial increase in the time it takes a pressure pulse to travel from the heart to the temple during high rates of headward acceleration for "unprotected" subjects, indicating the blood vessels are indeed distending considerably (Hrebien, L., "Current and Emerging Technology in G-LOC Detection: Pulse Wave Delay for $+G_z$ Tolerance Assessment", in Aviation Space and Environmental Medicine, January, 1988). The best method of counteracting neck artery diameter changes is to apply extreme pressure to the neck with water.

Since the water in the suit is nearly incompressible, it very effectively minimizes even the smallest distension disturbance within the neck. There is some question as to whether an air bladder surrounding the neck would work as well as water. Pneumatic bladders, for which the volume of the neck arteries distension would be very small in comparison to the total volume of the bladder, would offer very little additional resistance to such rapidly changing distension disturbances. Therefore, water again appears to be a much more logical choice for applying neck counterpressure.

THE PREFERRED EMBODIMENT

Figure 1:
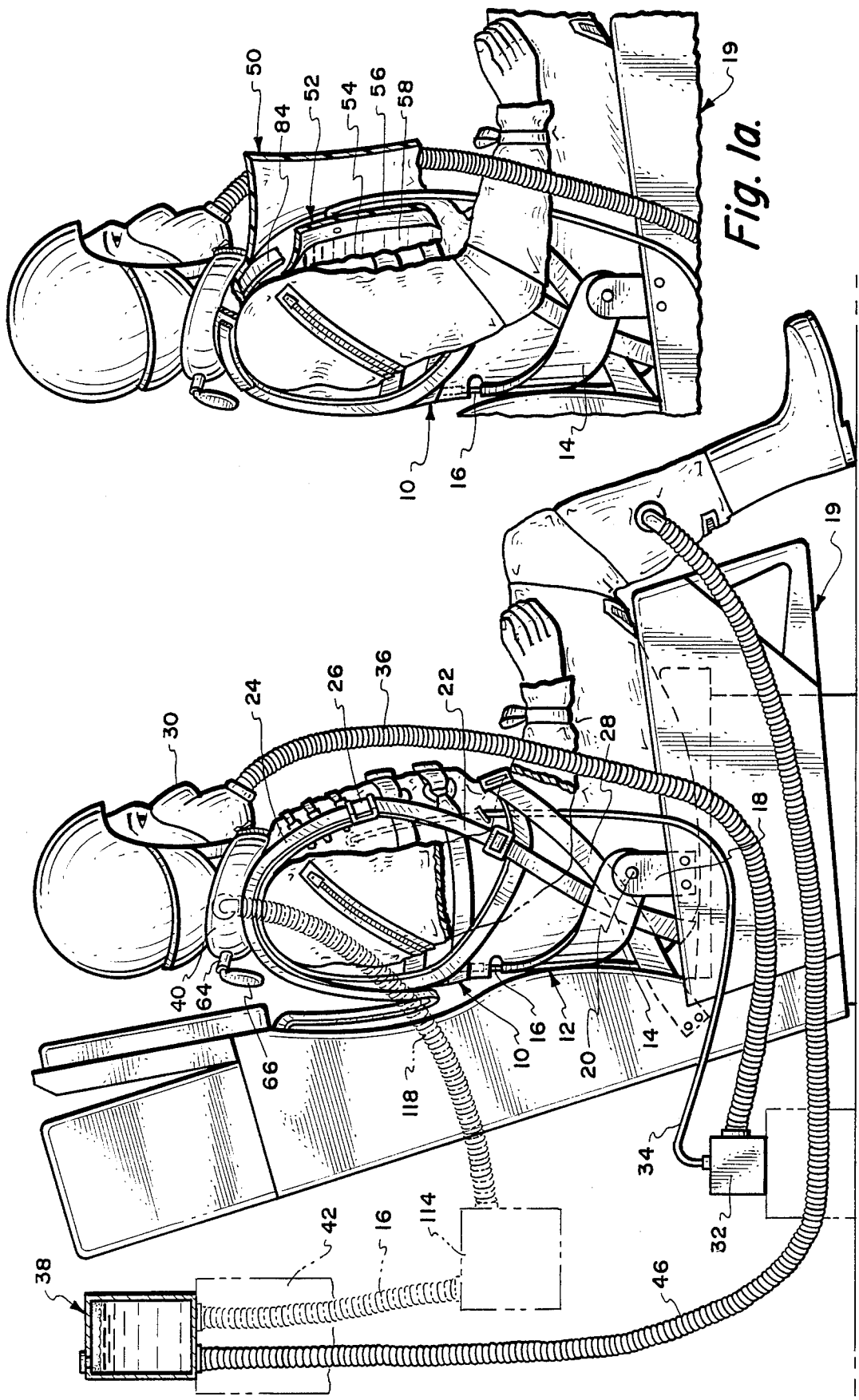
FIG. 1 is a side view of a crew member strapped into the seat of an aircraft wearing the hydraulic buoyancy suit of the present invention.

Referring now to the drawings and the characters of reference marked thereon, FIG. 1 illustrates a crew member or pilot seated on an aircraft seat assembly, and wearing the buoyancy suit of the present invention, generally designated 10. In this embodiment, a rigid suit support assembly 12 is provided for suspending suit 10 (which in turn supports the crew member) and providing comfort for the crew member during flight. Such support is required because the buoyancy suit, while filled with fluid, is relatively heavy. Water is the preferred fluid inasmuch as it has a specific gravity approximating that of blood. A hip flare portion 14 of the support assembly 12 is located on the exterior of the buoyancy suit 10. Portion 14 is connected by a pin joint 16 to the over-the-shoulders (OTS) portion which is incorporated within the buoyancy suit itself and therefore cannot be seen in this Figure. (The OTS portion extends upwardly and over the shoulders as described in greater detail below with reference to FIGS. 1a, 7a and 7b.) The hip flare portion 14 is detachably connected on each side to vertical extensions 18 of the seat assembly 19. Manually removable pins 20 provide this connection, thus allowing the crew member to attach and detach himself from the seat assembly 19, while wearing the buoyancy suit 10.

A standard torso harness 22 fits over the hydraulic buoyancy suit 10. The standard harness 22 connects to the parachute via parachute riser straps 24. Each parachute riser strap 24 is connected to the torso harness 22 by a buckle 26. A standard lap belt 28 is also utilized.

To operate properly, the pressure in the mask 30 should be substantially equal to the pressure in the buoyancy suit 10 at chest level. Pressure equalization is provided by a breathing regulator 32. The chest level pressure is sensed by a sensing line 34 which extends from the buoyancy suit 10 to the breathing regulator 32. The regulator 32 delivers appropriately pressured breathing gas to the mask 30 via the mask hose 36.

A fluid reservoir 38 is supported at head level so that the water level can be maintained at eye level to provide the correct pressure within the suit.

The reservoir 38 provides make-up water to the buoyancy suit 10 including its water-fillable collar 40. Addition of make-up water prevents the water level in the suit 10 from dropping dow when the suit 10 expands. The reservoir 38 is designed so as to have a diameter which provides sufficient make-up water to the suit 10 so that in the event the suit 10 expands under high g's the water level in the reservoir does not drop more than approximately an inch. The precise means 42 for supporting the reservoir is not important (provided it is supported at the correct height). Thus, the reservoir 38 may be supported by, for example, the seat assembly 19, the buoyancy suit 10, itself, or the cockpit back wall. A suit supply hose 46, which attaches to the leg portion of the buoyancy suit 10, supplies the make-up water from the reservoir 38.

Referring now to FIG. 1A, the different layers of the buoyancy suit 10 are shown in opened-up, cut-away fashion. The upper OTS portion 84 of the suit support assembly 12 is located under an outer suit 50 and over an inner suit 52. A hole cut in the outer suit 50 at the location of pin joint 16 provides the ability to associate the OTS portion 84 with the hip flare portion 14. The inner garment, i.e. inner suit 52, is formed of an inner layer 54 and an outer layer 56, both layers being formed of stretchable materials. The outer garment, i.e. outer suit 50, is formed of non-stretchable material. However, it is size adjustable, as explained in greater detail below, and can accommodate differences in crew members' anthropometry.

Figure 2:
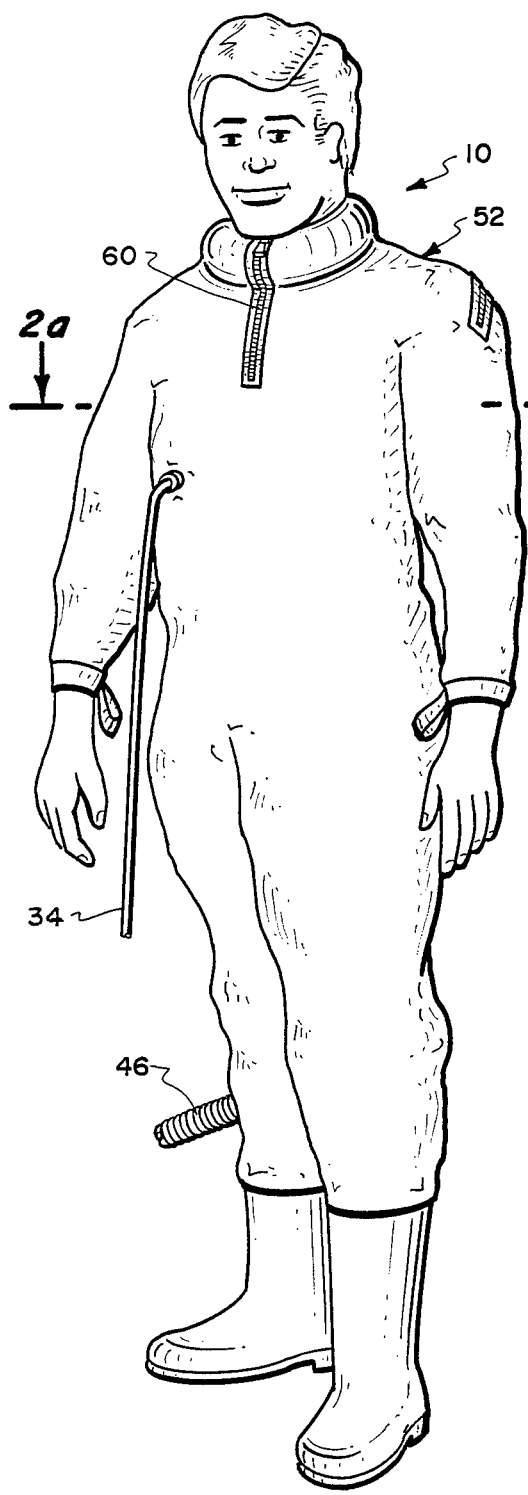
FIG. 2 is a front view of a crew member wearing only the inner garment of the hydraulic buoyancy suit.

FIG. 2 illustrates a crew member wearing only an inner suit 52. (The outer suit 50 has been removed.) The pressure sensing tube 34 is connected to the suit 52 at approximately chest level and provides an indication of pressure to the breathing regulator 32 (not shown in this Figure). A zipper 60 is provided for allowing the crew member to put his head through the collar 40 when donning or doffing the suit 10.

Figure 2A:
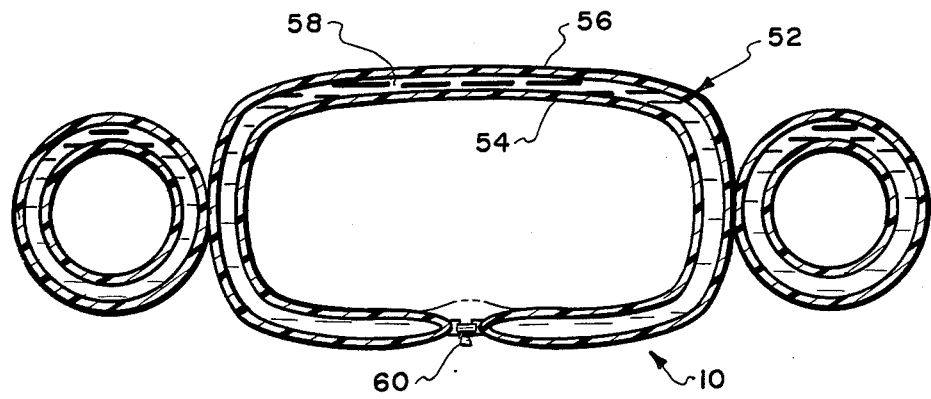
FIG. 2a is view taken along line 2a—2a of FIG. 2.

FIG. 2A is a view taken along line A—A of FIG. 2. This figure illustrates the outer layer 56 and the inner layer 54 of the inner suit 52, the layers 54,56 being separated by a layer of water 58. Both layers 54,56 of the inner suit 52 may be formed of a waterproof stretchable material, for example nylon.

Figure 3:
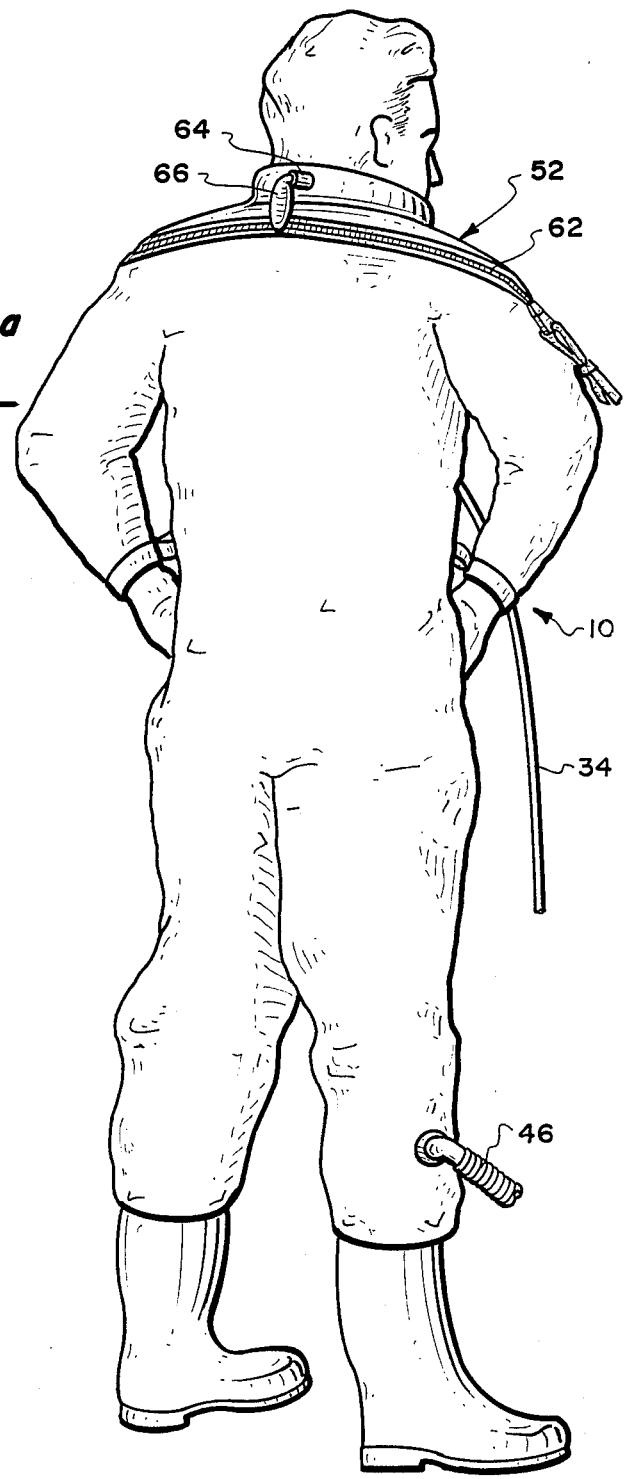
FIG. 3 is a back view of a standing crew member wearing only the inner suit.

Referring now to FIG. 3, the crew member is shown turned around and still attired in only the inner suit 52. A waterproof entry zipper 62 allows the crew member to enter and exit the inner suit 52. An air vent valve 64 is provided for allowing air to escape from the suit 10 when filling the suit 10 with water. An expandable balloon 66 is connected t the end of the valve 64 for containing any water which may flow out of the valve 64 during the filling process. The air vent valve 64 is closed after the suit is filled with fluid.

Figure 4:
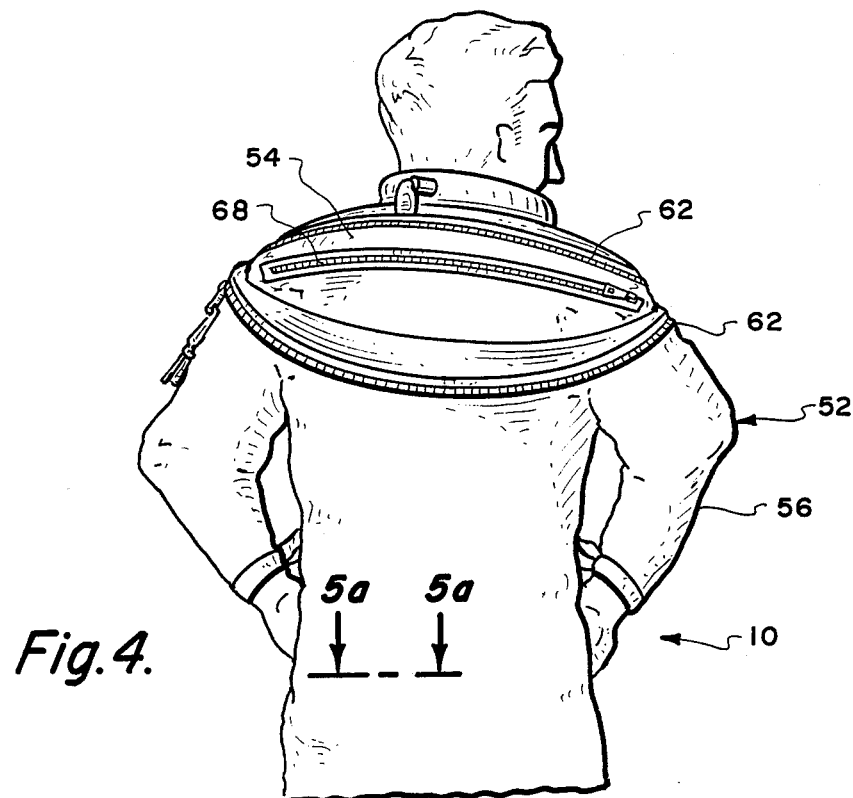
FIG. 4 is a back view of the crew member wearing an inner suit with the entry zipper open to reveal a portion of the inner layer of the inner suit.

Referring now to FIG. 4, the entry zipper 62 on the outer layer 56 of the inner suit 52 is shown open to reveal an inner entry zipper (which is shown closed) 68 on the inner layer 54 of the inner suit 52. Both the inner and outer zippers 62,68 must be opened in order for the crew member to ingress the suit 10. After the suit 10 is ingressed, both zippers 62,68 are sealably closed.

Figure 5A:
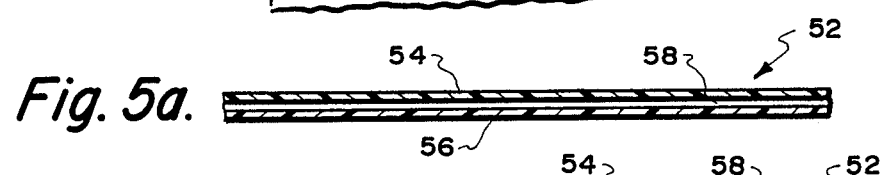
FIG. 5a is a view taken along line 5a—5a of FIG. 4.
Figure 5B:
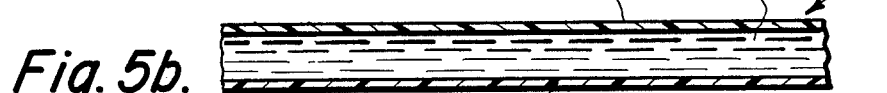
FIG. 5b illustrates the inner suit expanded when filled with fluid.

Referring now to FIG. 5a, a cross section of the inner suit 52 is illustrated. The space 58 between the inner and outer walls 54,56 becomes expanded when the suit 10 is filled with fluid, as shown in FIG. 5b.

Figure 5C:
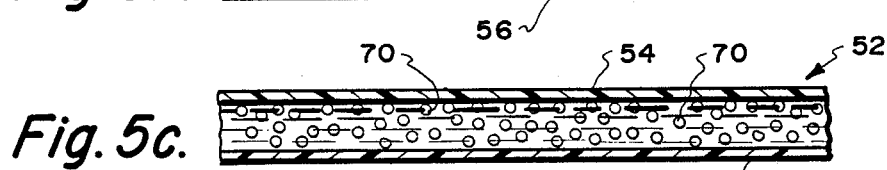
FIG. 5c illustrates the use of a filler material within the inner garment.
Figure 5D:
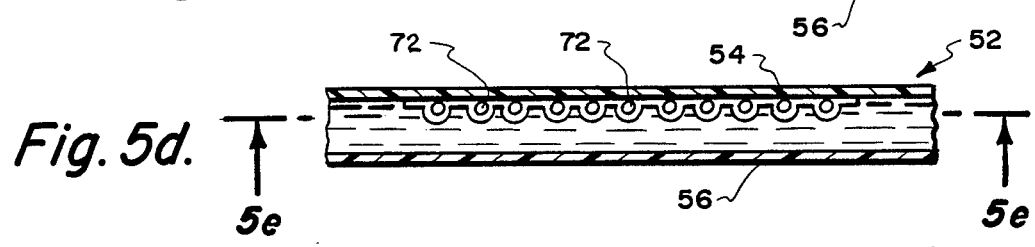
FIG. 5d illustrates the use of cylindrical elements as filler materials within the inner suits.
Figure 5E:
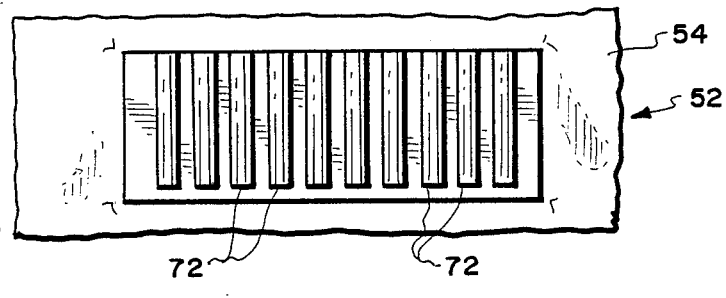
FIG. 5e is a view taken along line 5e—5e of FIG. 5d.

Alternative concepts for minimizing the weight of the inner suit are illustrated in FIGS. 5c to 5e. FIG. 5c illustrates the use of a filler material 70 which is less dense than water within the space between inner and outer walls 54,56 in order to reduce the overall weight of the inner suit 52. Examples of such filler materials include ceramic beads, hollow glass beads, cork, wood, and charcoal which has been waterproofed.

Rather than using generally spherical lightweight filler materials as suggested with reference to FIG. 5c, an alternate embodiment shown in FIGS. 5d and 5e illustrates use of cylindrical elements 72. Use of cylindrical elements 72 has the advantage over spheres of displacing a greater volume of water, thereby enhancing weight reduction. However, the use of such cylindrical elements 72 has the disadvantage of increasing the stiffness of the suit. It is noted that use of the filler materials, as described above, does not result in a pressure different than that had the suit been filled only with water, provided that a continuous path of water is maintained from the reservoir 38 down to the bottom of the suit 10.

Figure 6:
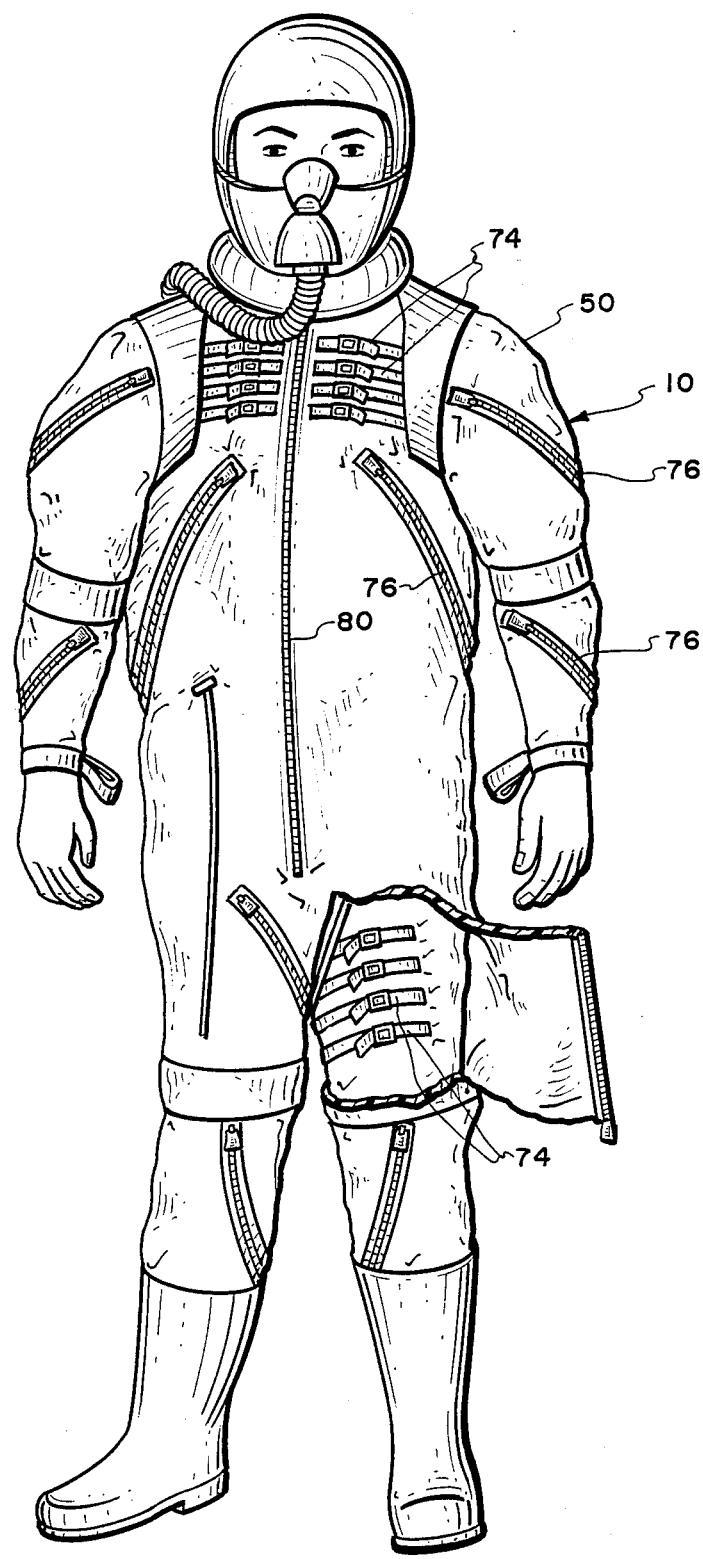
FIG. 6 illustrates a standing crew member wearing the hydraulic buoyancy suit of the present invention.

FIG. 6 is a perspective illustration of a crew member in a standing position wearing the hydraulic buoyancy suit 10 of the present invention. The outer suit 50 is shown in this Figure. As previously mentioned, the outer suit 50 is utilized to restrain inner suit 52 expansion. A plurality of length adjustable straps 74 are utilized throughout the outer suit 50 to provide suit size adjustment for different sizes and builds of crew members. For a neat appearance and to prevent accidental snagging of the straps integral, zippered coverings (e.g. zippers 76) are provided throughout the outer suit 50. The cut-away, opened up, left upper thigh portion, illustrates the manner in which the straps 74 are covered. The outer suit 50 includes an entry zipper 80.

In order to properly serve a constraining function, the outer suit 50 should be formed of a relatively high tensile strength flexible fabric, such as Kevlar, metal fiber reinforced fabric, or high strength plastic reinforced fabric. The shoulder, elbow and knee portions are preferably formed of a more flexible fabric to facilitate crew member arm and leg mobility. Examples of preferred materials include rubber, elastic fabrics and elastomers.

During use, the buoyancy suit is relatively heavy inasmuch as it is filled with fluid. Therefore, as noted, a support means 12 is required to provide crew member comfort and body support. Both the suit and the water within the suit are suspended by the supports. The crew member, in turn, literally "floats" within the suit, buoyed upwards by the hydrostatic forces of the water within the suit. This support arrangement provides the crew member a great deal of freedom of movement, even under high accelerations. Without the supports, the weight of the suit would pull down uncomfortably on the crew member's shoulders, considerably restricting freedom of movement.

Figure 7A:
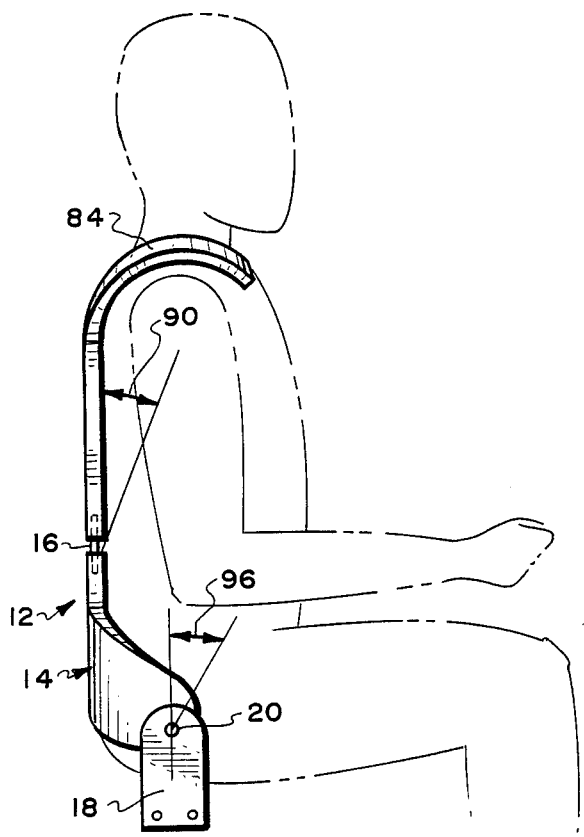
FIG. 7a illustrates a side view of the rigid, over the shoulder support assembly of the present invention, the crew member being shown in phantom.
Figure 7B:
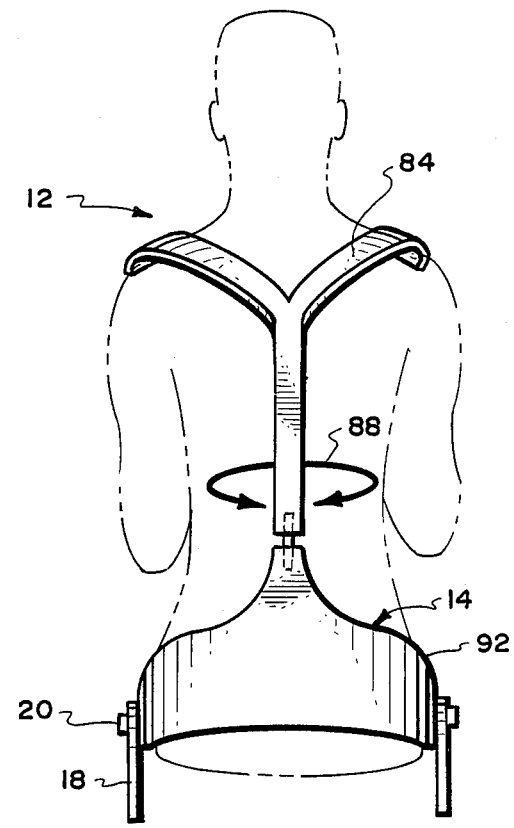

Referring now to FIGS. 7a and 7b, the rigid, suit support assembly 12 includes the OTS portion 84. OTS portion 84 is connected to the hip flare portion 14 by the pin joint 16 which allows movement in the direction of arrows 88 (see FIG. 7b). The OTS portion 84 extends from pin 16 up the back centerline, branches at the shoulder blade level and continues over each shoulder, down the front of the chest terminating at mid-chest level. Additionally, pin joint 16 is capable of accommodating some forward lean, as shown by arrow 90 in FIG. 7a. The hip flare portion 14 covers the lower back and wraps around the hips' sides. Hip flare portion 14 connects t the vertical extensions 18 of the seat assembly 44 (shown in FIG. 1). The pin joints 20 allow the pilot or crew member to lean forward, as shown by arrows 96 in FIG. 7a.

As described in the above Theoretical Considerations section, leaning forward increases g-tolerance for a g vector directed normal to the sitting surface since the eye-to-heart distance (as measured parallel to the g vector) is reduced.

Figure 8B:
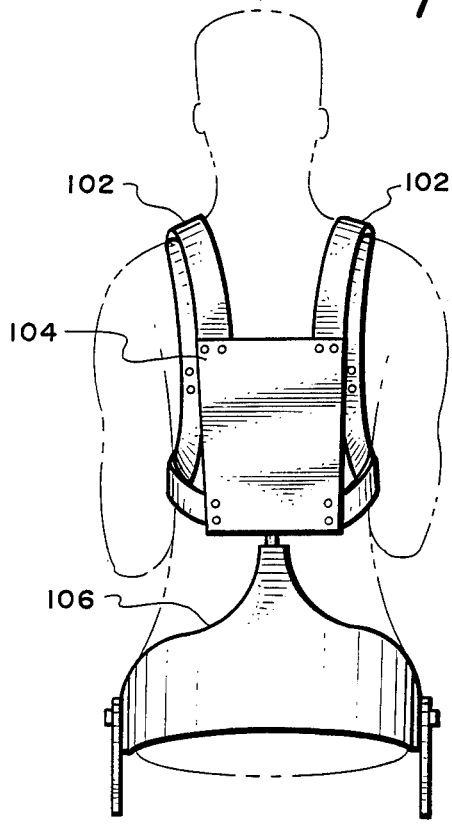
Figure 8C:
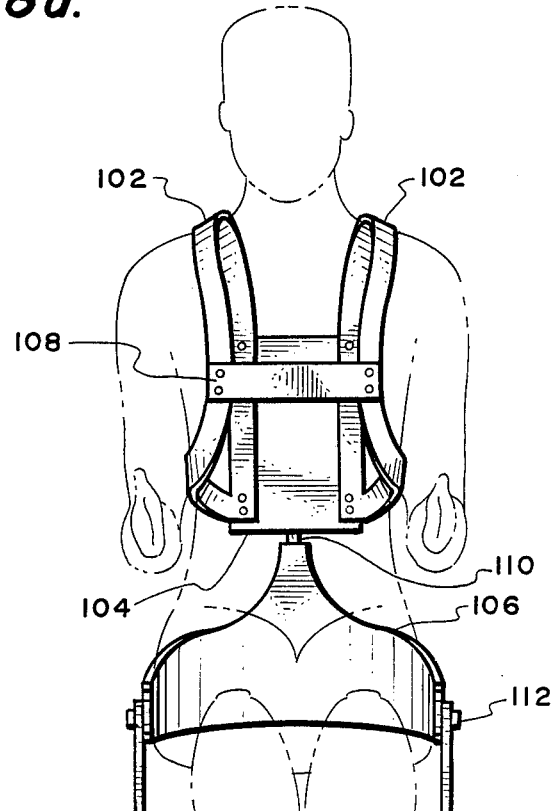

An alternate embodiment of a rigid suit support assembly, generally designated 100, is illustrated in FIGS. 8a–8c. This embodiment includes over-the-shoulder portions 102, each extending over the shoulders, around the upper chest and then passing under the arms. Portions 102 are integrally attached to an upper back plate 104. The lower portion 106 of support assembly 100 is similar to the corresponding lower portion 14 of the embodiment illustrated in FIG. 7. As shown in FIG. 8c, extra support is provided over the FIG. 7 embodiment by linking the over-the-shoulder portions 102 by an integral horizontal chest support plate 108. Crew member mobility, provided by joints 110,112, is substantially the same as in the previous embodiment. It is noted that in both embodiments, the portion of the support assembly 12 (100) above the point of connection 1 (110) to the lower back portion 14 (106) is located within the buoyancy suit itself, as explained above.

The buoyancy suit of the present invention is donned in generally the following manner:

The inner suit 52 (devoid of water) is first donned. Zippers 62,68 (see FIG. 4) are opened in order for the crew member to enter the inner suit 52. These zippers 62,68 are then secured closed. The outer suit 50 is then put on over the inner suit 52. All of the outer suit's size adjustment straps are then tightened. The torso harness 22 is then donned and size adjusted.

The following suit to seat connections can then be made as follows:

The oxygen mask hose 36 is connected to the breathing regulator 32. The suit pressure sensing line 34 is connected to the breathing regulator 32. The hip flare 14 is connected to the vertical extensions 18 of the sea assembly 19. The left and right parachute riser straps 24 are connected to the torso harness 22. The suit hose 44 is connected to the reservoir 38. The lap belt 28 is then secured in position.

The suit 10 can then be filled by pumping fluid into the reservoir 38. This causes the water in the reservoir 38 to flow through the supply hose 46 and into the buoyancy suit 10. When the water level in the buoyancy suit IO rises to the level of the valve 64, the buoyancy suit is filled and the air pressure is removed from the reservoir 38.

The suit has the potential for protecting the crew member from high amplitude oscillatory accelerations which may occur during escape from hypervelocity aircraft. This is a result of using a hydraulic fluid as the pressurization medium. Using water results in the suit exerting a pressure on the body which counteracts the shifts in blood within the body (caused by the oscillations) thereby reducing adverse physiological response. The protection is provided regardless of the acceleration direction.

Furthermore, the suit can provide protection from structural damage to the body (e.g., back and neck injury) which may be caused by high accelerations. It provides a sufficiently high pressure on the body to minimize deformation and thus differential motion of internal body structures. As noted, water immersion, the principle upon which the buoyancy suit design is based, has been demonstrated to provide higher g tolerance than suits which are pressurized with air (e.g., altitude pressure suits, g-pants).

The suit protects the wearer from exposure to reduced barometric pressure (as may be caused by cockpit depressurization or high altitude ejection). Two protective factors must be provided for high altitude exposure: counterpressure to the body's surface area to prevent the bends and ebulism (i.e. swelling resulting from tissue outgassing resulting from the exposure to the reduced barometric pressure) and respiratory protection. For respiratory protection, the mask 30 must be pressurized with oxygen to maintain consciousness. Due to the resulting high lung pressure, counterpressure is required to the rib cage and to the lower half of the body to assist breathing and to maintain normal blood circulation, respectively. The required suit pressurization can be implemented by pressurizing the reservoir 38 with air.

The suit 10 may be provided with features that provide crew protection after escaping from an aircraft. For example, it may be designed to provide protection from extreme temperatures such as those associated with high altitude open ejection seat escape and post-escape descent into cold climates. Protection from cold can be provided by including a temperature control/pump unit 114, illustrated in phantom in FIG. 1, to heat the water within the suit or replace the water with heated air. Hoses 116, 118 may, for example extend from collar 40 to unit 114 to reservoir 38. Protection from aerodynamic heating resulting from high speed open ejection seat escape is provided as a result of heat absorption by the water within the suit 10.

In the event of post-escape landing in water, the suit can provide floatation. This function can be implemented by rapidly forcing water out of the suit 10 with heated air, thereby inflating the suit 10 to provide buoyancy and also protection from the cold.

The suit 10 may also be designed to provide a comfortable in-flight thermal environment. A form of localized temperature control where the cooling or heating is directly applied to the crew member's body is desirable in aircraft since the environmental control system weight and power demand is reduced by cooling the man directly rather than by cooling the entire cockpit. The temperature control unit 114 may be adapted to circulate the suit water and provide the necessary fluid temperature within the suit for the wearer to be comfortable.

Obviously, many modifications and variations of the present invention are possible in light of the above teachings. It is, therefore, to be understood that within the scope of the appended claims the invention ma be practiced otherwise than as specifically described.

What is claimed and desired to be secured by Letters Patent of the United States is:

1. An apparatus for maintaining useful consciousness and reducing the risk of injury for a subject exposed to high levels of acceleration while in a vehicle, comprising:
    a buoyancy force suite for supporting said subject with a buoyancy force, said force suit including at least two layers of flexible material, each layer being relatively impermeable to a substantially incompressible fluid having a specific gravity approximating blood being locatable in a space between said layers, said suit for fitting over substantially the entire subject, including the subject's neck, said space covering substantially the entire area of the suit;
    a fluid reservoir in continuous fluid communication with said space between the layers of said buoyancy force suite for maintaining a constant fluid level within said buoyancy force suit during acceleration;
    means for supporting said fluid reservoir within said vehicle at substantially the subject's eye level for maintaining an optimal fluid pressure gradient for ensuring an efficient blood supply to the subject's brain;
    means for securely suspending said buoyancy suit within said vehicle; and
    breathing assist means for sensing the pressure within said force suit and providing a regulator for breathing, thus compensating for any increased pressure exerted on the subject's rib cage at a result of the use of the force suit,
    said force suit providing a balanced counterpressure to the force of acceleration, the force suit exerting pressure on substantially all body surface area underneath the suit, thereby reducing distension in the subject's blood vessels and the pooling of blood.

2. The apparatus of claim 1 wherein said buoyancy force suit includes an inner garment being formed by said at least two layers of flexible material and a size adjustable outer garment for constraining any hydrostatic pressure induced expansion of the inner garment.

3. The apparatus of claim 2 wherein said outer garment is formed of non-stretchable flexible fabric.

4. The apparatus of claim 3 further including adjustable straps attachable around said outer garment for allowing the bouyancy force suit to be adjusted for differences in the subjects' anthropometry.

5. The apparatus of claim 4 wherein said means for suspending said buoyancy suit within said vehicle includes a support assembly, including,
    a rigid over-the-shoulders (OTS) portion integrally connected to the buoyancy suit, and
    a hip flare portion having an upper end rotatably connected to said OTS back portion along a first axis substantially parallel to the subject, said hip flare portion having a lower end being connectable to the vehicle in such a manner so as to allow the subject to lean forward along a second axis substantially perpendicular to said first axis.

6. The apparatus of claim 5 wherein said OTS back portion includes two rigid over-the-shoulder members that intercept between the shoulder blades and terminate in an integral central member.

7. The apparatus of claim 5 wherein said hip flare portion includes two lateral, forwardly oriented hip flare members, each connecting to seat assembly of the vehicle.

8. The apparatus of claim 5 wherein said rigid OTS portion includes two over-the-shoulder members, each over-the-shoulder member extending over the shoulder, around the upper chest and under the arms and being integrally attached to an upper back plate.

9. The apparatus of claim 8 further including a horizontal chest plate integrally connected to said over-the-shoulder members.

10. The apparatus of claim 1 wherein said incompressible fluid locatable in the space between said layers is water.

11. The apparatus of claim 10 further including a substantially incompressible filler having a density less than water, being located between said layers.

12. The apparatus of claim 11 wherein said filler is in the form of a plurality of spherical elements.

13. The apparatus of claim 11 wherein said filler is in the form of a plurality of cylindrical elements.

14. An apparatus for maintaining useful consciousness and reducing the risk of injury for subject exposed to high levels of acceleration while in a vehicle, comprising:

a buoyancy force suit for supporting said subject with a buoyancy force, including, an inner garment being formed of two layers of flexible materials, each layer being relatively impermeable to a substantially incompressible fluid locatable in a space between said layers, and a size-adjustable outer garment being fittable about said inner garment, said outer garment being formed of non-stretachable fabric for constraining any hydrostatic pressure induced expansion of the inner garment, said buoyancy force suit for fitting over substantially the entire subject, including the subject's neck, said space covering substantially the entire area of the suit;

a fluid reservoir in continuous fluid communication with said space between the layers of said buoyancy force suit for maintaining a constant fluid level within said buoyancy force suit during acceleration;

means for supporting said fluid reservoir within said vehicle at substantially the subject's eye level for maintaining an optimal fluid pressure gradient for ensuring an efficient blood supply to the subject's brain;

means for securely suspending said buoyancy suit within said vehicle;

breathing assist means for sensing the pressure within said force suit and for providing a regulator for breathing, thus compensating for any increased pressure exerted on the subject's rib cage as a result of the use of the force suit;

said force suit providing a balanced counterpressure to the force of acceleration, the force suit exerting pressure on substantially all body surface area underneath the suit, thereby reducing distension in the subject's blood vessels and the pooling of blood.

15. A method for maintaining useful consciousness and reducing the risk of injury for subject exposed to high levels of acceleration while in a vehicle, comprising:

supporting said subject with a buoyancy force within a buoyancy force suit, said buoyancy suit including at least two layers of flexible material, each layer being relatively impermeable to a substantially incompressible fluid having a specific gravity approximating blood being locatable in a space between said layers, said subject being supported with a buoyancy force over substantially his entire body, including his neck, said space covering substantially the entire area of the suit;

maintaining a constant fluid level within said buoyancy force suit during acceleration by providing a fluid reservoir in continuous fluid communication with said space between the layers of said buoyancy force suit;

supporting said fluid reservoir within said vehicle at substantially the subject's eye level for maintaining an optimal fluid pressure gradient for ensuring an efficient blood supply to the subject's brain;

securely suspending said buoyancy suit within said vehicle; and sensing the pressure within said force suit and providing regulated breathing, thus compensating for any increased pressure exerted on the subject's rib cage at a result of the use of the force suit, said force suit thereby providing a balanced counterpressure to the force of acceleration, the force suit exerting pressure on substantially all body surface area underneath the suit, thereby reducing distension in the subject's blood vessels and the pooling of blood.

* * * * *